Patented Sept. 14, 1937

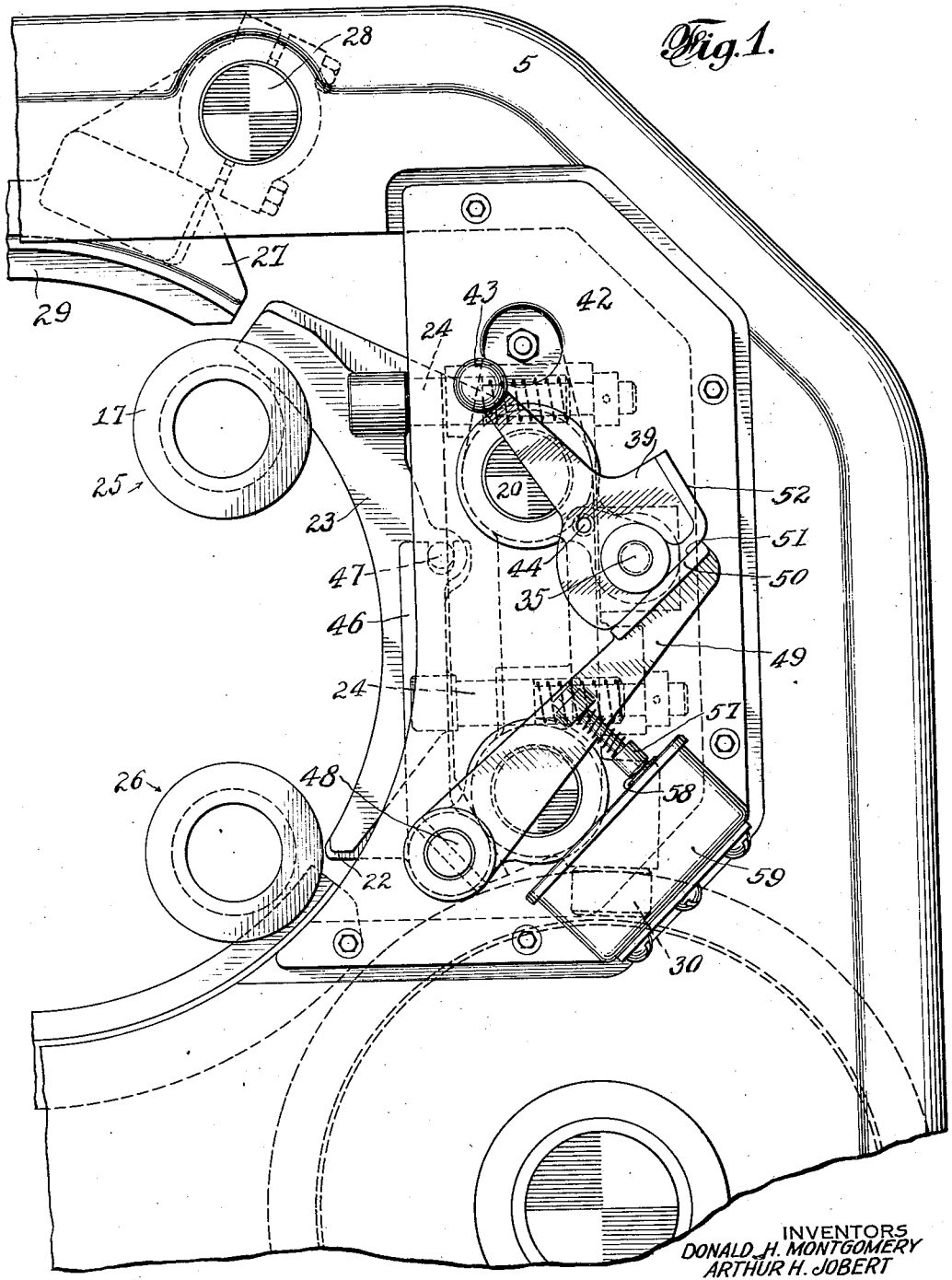

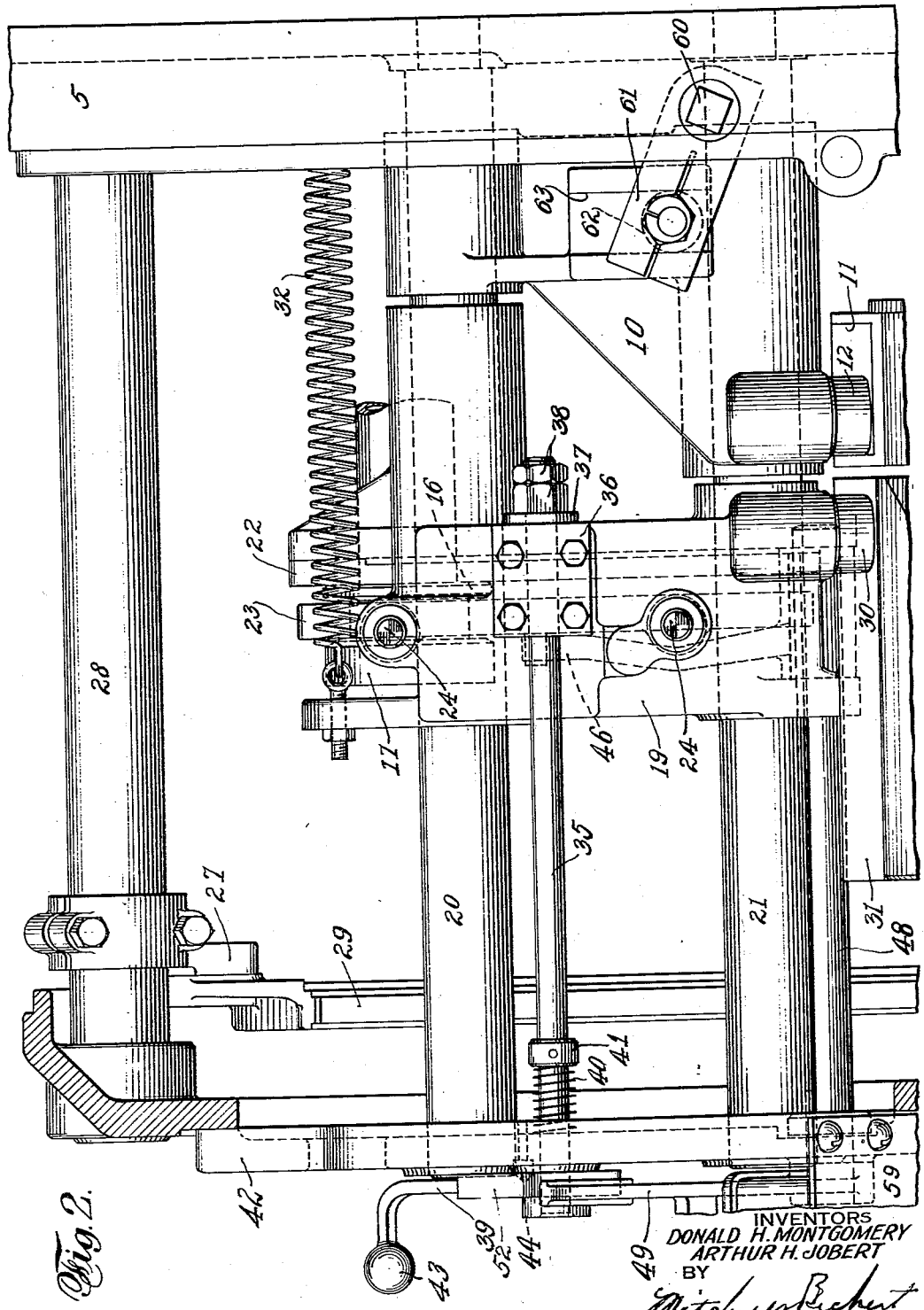

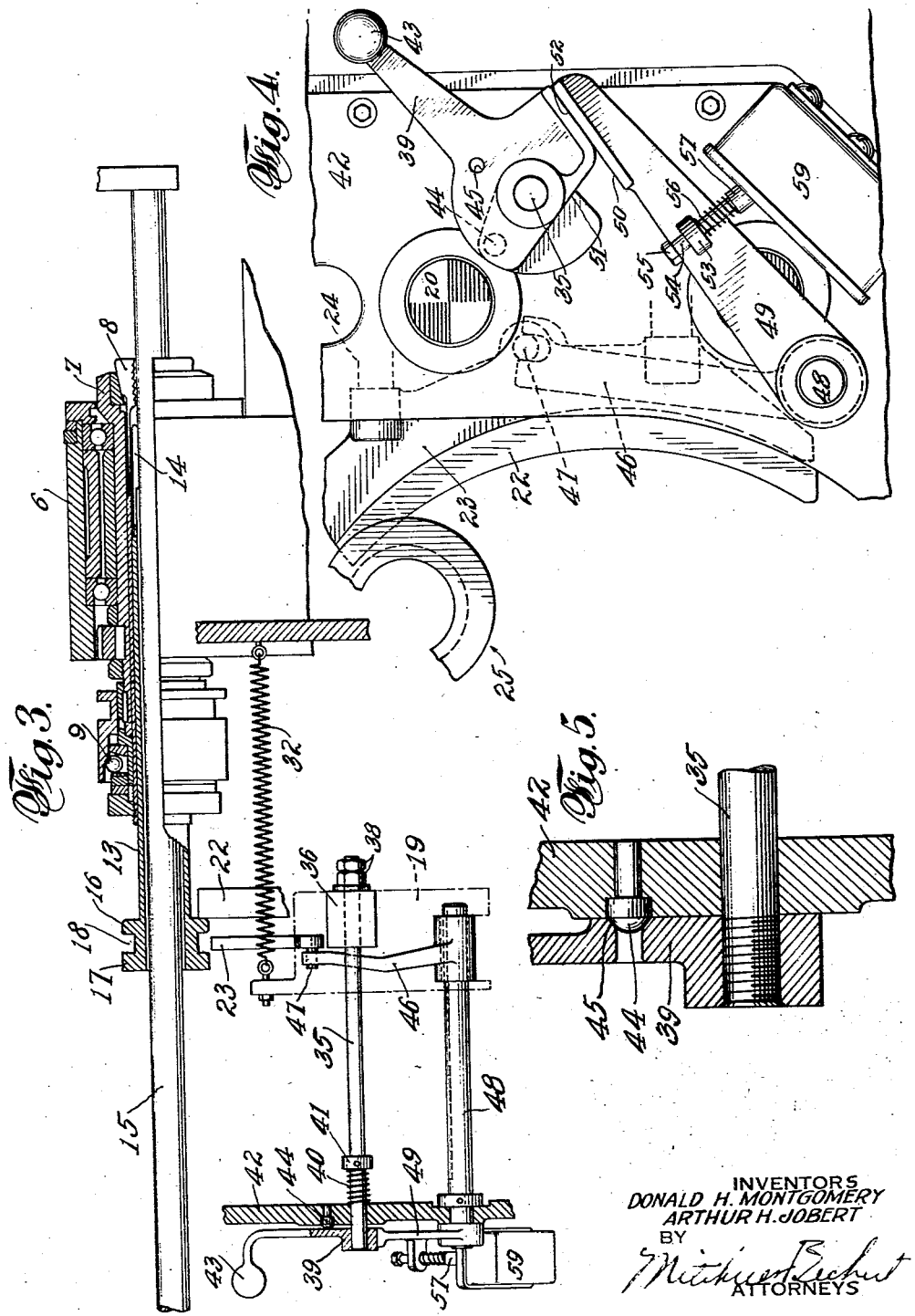

2,093,112

UNITED STATES PATENT OFFICE 2,093,112

STOCK FEED MECHANISM

Donald H. Montgomery, Berlin, and Arthur H. Jobert, New Britain, Conn., assignors, by mesne assignments, to The New Britain Machine Company, New Britain, Conn., a corporation of Connecticut Application September 11, 1935, Serial No. 40,076

9 Claims. (Cl. 29—62)

Our invention relates to a bar machine and more particularly to stock feed mechanism for such a machine.

In stocking up a bar machine the bar stock is bumped through the feed tube and up against a stock stop. In order to prevent the stock from drifting back away from the stock stop when the spindle is put in rotation and before the chuck is closed, resort is often had to manual closing of the chuck while the stock is up against the stock stop. Such a procedure is both time and labor consuming. Furthermore, operators often restock while the spindle is in rotation, thus subjecting themselves to serious dangers. In bumping stock through the feed tube, if the feed spool remains in engagement with the feed shoe, there is likelihood of damage to either the feed shoe or the spool or both.

It is an object of our invention to provide means to overcome the difficulties and disadvantages above enumerated.

More specifically it is an object to provide a bar machine with certain features in the way of safeguards to prevent or discourage an operator from stocking the machine while the spindle is rotating, as well as to prevent bumping the stock through while the feed shoe and feed tube spool are in engagement with each other.

It is another object to provide means for definitely maintaining a new bar of stock which has been bumped through the feed tube and into engagement with the stock stop in engagement with the latter after the spindle has been started in rotation and before the chuck has closed.

It is a further object to provide means for stopping the spindle rotation and at the same time disengaging the feed shoe from the feed spool and preventing restarting of the spindle after stocking up until the feed shoe has again become engaged with the feed spool.

It is still another object to provide means for stopping the spindle correlated to one or more features of stock feed mechanism.

Other objects and various features of invention will be hereinafter pointed out or will become apparent to those skilled in the art.

Briefly stated, in a preferred form of the invention we employ a feed slide urged in a stock feeding direction by means of a spring but restrained or guided in stock feeding direction by a receding cam. The stock feed slide is retracted by means of a cam. The feed slide embodies a feed shoe and what we term a return shoe, the feed shoe being normally engaged between the flanges of the feed spool and the return shoe being located forwardly of the front flange of the spool and serving to take the thrusts incident to bumping stock through the feed tube. When bar stock in the spindle has been exhausted to such an extent that the feed mechanism would feed short, the feed slide is moved forward under the influence of the spring to an abnormal extent, the chuck of course being open. When in that general position the feed tube is restocked. We provide means for retracting the feed slide and with it the feed tube a slight amount and maintaining the same in such slightly retracted position while the stock is bumped through the feed tube and up against the stock stop. During such restocking the feed shoe has been retracted and the feed spool is restrained against forward movement by the return shoe. When the feed tube has been restocked the feed shoe is again engaged with the spool and the tube is released from its retracting means and urged forward by the feed spring. If the stock is not definitely up against the stock stop it will be definitely urged into engagement therewith and so held until after the spindle has been put in rotation and the stock automatically chucked.

When it is necessary to restock as aforesaid, we preferably substantially simultaneously slightly retract the feed slide, withdraw the feed shoe from the feed spool and actuate a machine control member, such as an electric switch, for stopping the spindle rotation. Preferably the machine may not be again started until the feed shoe is in proper engagement with the feed spool.

Specifically, we shall describe our invention as embodied in a multiple spindle bar machine of the type disclosed in Gridley et al. application, Serial No. 551,136, filed July 16, 1931.

In the drawings which show, for illustrative purposes only, a preferred form of the invention—

Fig. 1 is a fragmentary end view of a bar machine of the type disclosed in said Gridley et al. application and illustrates features of the invention;

Fig. 2 is a side sectional view through the machine shown in Fig. 1 and illustrating features of the invention;

Fig. 3 is a more or less diagrammatic view in partial section of a spindle and various features associated with a machine of the type indicated and illustrates features of the invention;

Fig. 4 is a fragmentary view similar to Fig. 1 but illustrating parts in different positions; and Fig. 5 is an enlarged fragmentary view of the means for retracting or camming back the feed slide before stocking up or restocking.

In said drawings and as further disclosed in said Gridley et al. application the machine comprises a frame 5, having a spindle carrier 6 and a plurality of spindles 7, as will be understood. Each spindle includes a spring chuck 8, which may be actuated as by means of a ball type chucking device, designated generally 9 and actuable by a chucking slide 10 and chucking cam 11, engageable with a roller 12 on the slide. Within each spindle is a feed tube 13, having spring feed fingers 14 for frictionally gripping the bar of stock 15, as will be understood. The feed tube is provided with a spool comprised of flanges 16—17 and defining a spool groove 18 therebetween.

A feed slide 19 is mounted for sliding movement on a pair of rods 20—21, carried by the machine frame. The chucking slide 10 is likewise mounted on the same pair of rods. The feed slide 19 carries or embodies what may be termed a return shoe 22, which is preferably a fixed part of the slide. The slide also carries a feed shoe 23, which is mounted upon a pair of studs 24—24, slidable in the feed slide and resiliently urged outwardly so as to move the feed shoe into engagement with the groove 18 of the feed spool. The feed shoe extends arcuately and is of a length to fit within the feed spool of the feed tube in the feeding station, as indicated at 25 in Fig. 1, and to remain in engagement during most of the indexing movement of the feed tube from the position shown at 25 until it reaches the first work station, indicated at 26. The machine frame carries a bracket 27, adjustably secured on a pair of rods, one of which is indicated at 28. The bracket is adjustable along the rods 28, so as to take care of various feeds. The bracket 27 carries a guard ring 29, positioned in a line with or so as to register with the feed shoe 23 when the latter is in fully normally retracted position. Thus the spools of the feed tubes are held against any endwise movement, whether or not engaged with the stock by the guard ring in all work stations and such guard ring delivers the spool in each feed tube to the feed shoe 23 and the latter, of course, delivers each spool to the guard ring 29 during indexing.

The feed slide 19 has a feed roll 30, engageable with a feed cam 31, carried on the same cam shaft with the chucking cam 11. The feed slide is normally urged and fed forwardly in a feeding direction by means of a spring 32 interposed between the slide and the frame. During feeding movement the spring moves the slide forwardly and the receding cam 31 limits the speed of feeding until the stock engages the stock stop, as indicated in Fig. 3, after which the receding cam has no further effect on the feed slide and the feed slide is held stationary by the stock stop in engagement with the stock.

When a bar of stock is exhausted in any one feed tube the feed slide moves forwardly to an abnormal position and the machine may then be stopped, either automatically or semi-automatically, for example, as indicated in said Gridley et al. application, and the chuck is open, as indicated in Fig. 3. The butt end of stock is then removed and a new bar is to be inserted.

Our invention relates to certain features connected with restocking as will now be explained.

We have provided means for slightly retracting the feed slide during restocking so that when the stock has been bumped through the feed tube and into engagement with the stock stop and the feed slide released the spring 32 will continue to urge the stock into engagement with the stock stop and the stock cannot drift back, as would be the case if it had simply been bumped into engagement with the stock stop and the spool then reengaged with the feed shoe.

In the form shown we employ a stop bar 35, freely slidable through a bracket 36 on the slide and provided with a resilient washer 37 and stop nuts 38. The rear end of the bar 35 is fixedly carried in the hub of a lever member 39 and the bar 35 is urged and normally held forwardly by a spring 40 interposed between a collar 41 and the rear frame part 42 of the machine. As stated above, when the stock has been exhausted the spring 32 moves the slide forwardly to an abnormal feed position, that is, to such an extent that it is restrained from further movement by coming into engagement with the spring washer 37, backed up by the stop nuts 38. While the slide is thus restrained by bar 35 the lever 39 is rotated clockwise (Figs. 1 and 2) by means of the handle 43 and in so doing the lever and rod 35 are cammed rearwardly, the particular means employed being a round headed fixed cam stud 44, carried by the frame 42 which is normally engaged with the flared opening 45 in the lever 39 when the latter is in normal position. When the lever and rod 35 are cammed back they will be positioned substantially as shown in Fig. 3, the normal position being as shown in detail in Fig. 5. Such a movement of the lever is availed of for withdrawing the feed shoe 23 from the spool of the feed tube in feeding station and also for stopping the rotation of the spindle.

In the form shown we employ a lever 46, having a fork engageable over a pin 47 on the feed shoe and rigidly mounted on a pivot shaft 48 extending through the rear end of the frame. On the outside of the frame the shaft 48 has rigidly mounted thereon a second lever 49, having at the free end thereof a face 50 for engagement with either of the cam faces 51 or 52 of the lever 39. The face 51 is nearer the pivot point or shaft 35 than is the face 52. Consequently, when the lever 39 is rotated clockwise from the position shown in Fig. 1 and into the position shown in Fig. 4, the lever 49 is moved or cammed downwardly or clockwise and consequently the lever 46 will be rocked so as to withdraw the feed shoe 23 from the feed spool of the feed tube in the feed station. Thus, on the clockwise rotation of the lever 39 the first action will be to cause the lever 39 to be cammed out on the round nosed pin 44, so as to retract the rod 35 and with it the feed slide. Further rotation, as stated, causes disengagement of the feed shoe 23 from the feed spool. The feed spool is then restrained against forward movement by the engagement of the forward spool flange 16 with the return slide 22, as shown more particularly in Figs. 2 and 3.

The lever 49 has a lug or bracket 53, carrying a switch actuating member 54, the head 55 of which abuts the bracket 53 when the lever is in the position shown in Fig. 1, and serves to prevent inward movement of the pin 54. A spring 56 interposed between the bracket 55 and the head 57 on the actuating pin 54 urges the pin inwardly or in general downwardly, as illustrated. The head 57 of the pin is positioned over a push button switch member 58 in the switch box 59, and if the lever 49 holds the switch actuating pin 54 in the position shown in Fig. 1, the switch 58 will not be actuated. However, early in the rocking movement of the lever 49 the spring 56 serves to force the head 57 downwardly to actuate the switch 59. The latter is in series with the main starting switch of the solenoid or other main motor control switch, so that upon the first rocking movement of the lever 49 the switch 58 is actuated so as to stop the main motor or throw out a clutch or other device for stopping the rotation of the spindles.

The operation of our invention is as follows: Upon a run-out of stock in a spindle the feed works may be thrown out either manually or automatically or semi-automatically, for example, as shown in said Gridley et al. application. The feed works are thrown out with the spindle in loading station, the chuck open and the feed slide in its maximum forward position, that is, with the feed slide restrained against further forward movement under the influence of feed spring 32 by the rod 35 and its abutment collar or nut. The operator then grasps the handle 43 to rock the lever 39 in a clockwise direction from the position shown in Fig. 1 until the lever occupies the position shown in Fig. 4. During such rocking movement of the lever 39 the rod 35 and consequently the feed slide are cammed rearwardly by the cam stud 44, the switch 58 actuated to stop the spindles and the feed shoe 23 withdrawn from engagement with the feed spool. The latter is then restrained against forward movement by the return shoe 23. A fresh bar of stock is then inserted through the rear of the feed tube and bumped through the feed fingers. It will be noted that the feed spool flange 16 will bump against the return shoe 23 and there is no possibility of injuring the more delicate feed shoe 23 and spool groove 18 during the bumping of a fresh bar of stock through the feed fingers and up to the stock stop. Furthermore by withdrawing the feed shoe from engagement with the feed spool it will be seen that bumping the bar of stock through the feed tube is facilitated for the reason that the bar of stock and feed tube may be easily drawn rearwardly and then quickly forced forward until the flange 16 abuts the return shoe 23. If the feed shoe 23 remained in engagement with the spool groove 18 it would be necessary for the operator in stocking up to manually withdraw the entire feed slide against the action of the relatively heavy spring 32, in order to bump the stock through. Restocking is thus greatly facilitated and all danger of damage to the feed shoe is obviated.

When the fresh bar of stock has been inserted and forced into engagement with the stock stop the ordinary operation with prior art machines would be the manual closing of the chuck, as by engagement of the wrench with the square head 60 of the lever 61, which carries a roll 62 sliding in the grooved way 63 of the chucking slide 10. In fact, for purposes of illustration the chucking slide is shown in Fig. 2 in the position it would occupy if manually closed as aforesaid. Such manual closing of the chuck in many prior art machines is necessary because of the fact that if the spindles are again put in rotation before the chuck is closed there is likelihood of having the stock drift back away from the stock stop before the chucking cam automatically closes the chuck and therefore the first feed will be short. However, with a machine equipped with our improved devices it is not necessary to manually close the chuck (in many cases a very laborious undertaking).

When the stock has been forced manually into engagement with the stock stop the feed spool will normally be in engagement with the return shoe 22. The lever 39 is then rocked from the position shown in Fig. 4 to the position shown in Figs. 1 and 2. The first part of the movement of the lever 39 serves to permit the return of the feed shoe 23 to engagement with the feed spool groove 18. Further movement causes the engagement of the head 55 of the switch actuator 54 with the bracket 53 and permits actuation of the push button switch 58 under spring action or otherwise and finally the cam stud 44 drops into the tapered opening 45 of the lever and permits forward movement of the feed slide so that with the feed shoe 23 now engaged with its spool the feed tube will be urged forwardly by the feed spring 32, so as to urge the stock into engagement with the stock stop and maintain it in engagement with the stock stop until the chucking slide 11 automatically chucks the stock, after which the feed slide is retracted by the return cam on the feed cam drum after the machine is again started, as will be understood.

It will be noted that, since the switch 58 is in series with the main starting switch of the machine and that switch controls a solenoid or other device, the mere throwing of the lever 39 to the position shown in Fig. 1 will not ordinarily start the machine but merely positions the switch member 58 so that upon actuation of the main starting switch manually the spindles will again be put in rotation.

It will be observed that if, for any reason, the feed spool is not in such a position that the feed shoe 23 will engage with the spool groove 18 but instead rides on top of the flange 16, the lever 49 will not return to the position shown in Fig. 1 and the switch 58 will be maintained in its depressed position and, that switch being in series the main starting switch, the machine may not be again started until the feed shoe is properly engaged with the groove of the feed spool. Thus, likelihood of damage to any of the parts by reason of a failure of the feed shoe to engage the feed spool is eliminated.

It will be seen that by means of our invention restocking is rendered relatively easy and further the spindle rotation must be stopped before restocking takes place. Thus, the great danger of operators attempting to restock with the spindles in rotation is avoided. Furthermore, short feeding immediately after restocking is entirely avoided and any danger of damage to the feed shoe is avoided and further damage thereto by reason of improper engagement or failure of engagement of the feed shoe and the feed spool is also avoided.

While the invention has been described in considerable detail and a preferred form shown as applied to a multiple spindle bar machine as disclosed in said Gridley et al. application, it is to be observed that various changes may be made and the machine equipped with various other devices cooperating with or combined with the features of our present invention and that various features are applicable to machines of other types, all as is contemplated within the scope of the appended claims.

We claim:

1. In a machine of the character indicated, a spindle, a feed tube in said spindle, abutment means to limit movement of said tube in feeding direction whereby stock may be manually fed through said tube up to a stock stop with said tube in forward position as limited by said abutment means, and means for moving said abutment means to permit further forward movement of said tube, for the purpose described.

2. In a machine of the character indicated, a spindle, a feed tube, a feed shoe for engagement with said feed tube, means for actuating said feed shoe for moving said feed tube, and a common means for withdrawing said feed shoe from engagement with said feed tube and retracting said feed tube and holding the same in retracted position while stocking said tube with bar stock for the purpose described.

3. In a machine of the character indicated, a spindle, a feed tube, a feed slide embodying a feed shoe and a return shoe, means for urging said slide in a stock feeding direction, means for moving said slide in return direction, and means for retracting said feed slide and disengaging said feed shoe from said feed tube while stocking said feed tube with bar stock, for the purpose described.

4. In a machine of the character indicated, a spindle, a stock feed tube, a feed slide having means for engagement with said feed tube for actuating the latter, stop means for limiting the forward movement of said feed slide upon a runout of bar stock in said tube, and means for retracting and holding retracted said stop means while restocking said feed tube with bar stock, for the purpose described.

5. In a machine of the character indicated, a spindle, a feed tube therein, a stock feed slide having a feed shoe and a return shoe for engagement with said feed tube, and means for simultaneously disengaging said feed shoe and said feed tube and retracting said return shoe for retracting said feed tube when stocking said feed tube with bar stock, for the purpose described.

6. In a machine of the character indicated, a spindle, a feed tube therein, a feed shoe for engagement therewith, a machine control member, means for disengaging said feed shoe and feed tube and actuating said machine control member for stopping said machine, and means for preventing starting of said machine until said feed shoe is again properly engaged with said feed tube.

7. In a machine of the character indicated, a spindle, a feed tube therein, a feed shoe for engagement with said feed tube for actuating the same, and common means for disengaging said feed shoe and feed tube, stopping said machine and retracting and holding retracted said feed tube, for the purpose described.

8. In a machine of the character indicated, a spindle, a feed tube therein, a feed slide embodying a feed shoe and a return shoe, both engageable with said feed tube, a spring for urging said feed slide in feeding direction, a cam for guiding said feed slide in feeding direction, a stop bar engageable with said feed slide upon an abnormal inward feed movement thereof, and means for retracting said stop bar and feed slide a small amount and holding the same in retracted position against the tension of said feed spring, for the purpose described.

9. In a machine of the character indicated, a spindle, a feed tube therein, a feed slide for said feed tube, a machine control member, and a common means for retracting said feed slide and holding the same in retracted position and detaching said feed shoe from said feed tube and actuating said control member to stop said machine, said means being arranged to prevent return of said machine-actuating member to machine-actuating position until the complete return of said shoe to engagement with said feed tube.

DONALD H. MONTGOMERY.
ARTHUR H. JOBERT.